United States Patent
Sinn (10) Patent No.: US 9,973,057 B2
(45) Date of Patent: May 15, 2018

(54) LINEAR GENERATOR AND LINEAR DRIVE

(71) Applicant: SINN Power GmbH, Gauting (DE)

(72) Inventor: Philipp Sinn, Gauting (DE)

(73) Assignee: SINN Power GmbH, Gauting (DE)

( * ) Notice: Subject to any disclaimer, the term of this patent is extended or adjusted under 35 U.S.C. 154(b) by 311 days.

(21) Appl. No.: 14/762,557

(22) PCT Filed: Jan. 30, 2014

(86) PCT No.: PCT/EP2014/051824
§ 371 (c)(1),
(2) Date: Sep. 3, 2015

(87) PCT Pub. No.: WO2014/118290
PCT Pub. Date: Aug. 7, 2014

(65) Prior Publication Data
US 2016/0006317 A1    Jan. 7, 2016

(30) Foreign Application Priority Data

Feb. 1, 2013  (DE) .......................... 10 2013 201 716

(51) Int. Cl.
*F03B 13/10* (2006.01)
*F03B 13/12* (2006.01)
(Continued)

(52) U.S. Cl.
CPC ............... *H02K 7/06* (2013.01); *F03B 13/16* (2013.01); *F03B 13/186* (2013.01); *F03D 9/25* (2016.05);
(Continued)

(58) Field of Classification Search
CPC .......... F03B 13/12; F03B 13/14; F03B 13/16; F03B 13/20; F03B 13/22; Y02E 10/30; Y02E 10/38
(Continued)

(56) References Cited

U.S. PATENT DOCUMENTS 628,457 A * 7/1899 Gehre ..................... F03B 13/20
185/30
3,632,031 A    1/1972 Gurner et al.
(Continued)

FOREIGN PATENT DOCUMENTS

DE    2005386 A1    9/1970
DE    69520678 T2   11/2001
(Continued)

OTHER PUBLICATIONS

International Preliminary Report on Patentability, corresponding International Application No. PCT/EP2014/051824, dated Aug. 4, 2015.
(Continued)

*Primary Examiner* — Tulsidas C Patel
*Assistant Examiner* — Thomas Quigley
(74) *Attorney, Agent, or Firm* — Marshall, Gerstein & Borun LLP (57) ABSTRACT

Device for the reversible transfer of linear motion into rotational motion and for the conversion of rotational motion into electrical energy and vice versa. The device comprises a central rail and a support element which surrounds the central rail or is being surrounded by the central rail, the support element being positioned so as to be capable of performing a linear motion relative to the central rail in the longitudinal direction of the central rail. A number of rolling bodies which are in contact with the central rail are rotationally mounted in the support element. The rolling bodies rotate during the linear motion of the support element relative to the central rail in conjunction with the central rail. The linear motion is also connected to the drive or output of an electric machine. The elastically preloaded rolling bodies are arranged so that the central rail is essentially mounted with zero clearance under pressure, whereby the preload (Continued)

forces cancel each other out and are produced by elastically deformed retaining brackets on the support element. The rotations of at least one rolling body form the drive or output of the electric machine.

14 Claims, 8 Drawing Sheets

(51) Int. Cl.
    *H02K 7/06*            (2006.01)
    *F03B 13/18*           (2006.01)
    *F16H 19/02*           (2006.01)
    *F03B 13/16*           (2006.01)
    *H02K 41/02*          (2006.01)
    *F03D 9/25*            (2016.01)

(52) U.S. Cl.
    CPC ............ *F16H 19/025* (2013.01); *H02K 41/02* (2013.01); *F05B 2260/4031* (2013.01); *F05B 2260/50* (2013.01); *Y02E 10/38* (2013.01)

(58) Field of Classification Search
    USPC .......................................................... 290/53
    See application file for complete search history.

(56) References Cited

U.S. PATENT DOCUMENTS

| | | | | |
|---|---|---|---|---|
| 3,697,764 A * | 10/1972 | Stanziola | ................... | F02C 6/16 290/42 |
| 3,959,663 A * | 5/1976 | Rusby | ................... | F03B 13/262 290/53 |
| 3,964,264 A * | 6/1976 | Tornabene | ............ | F03B 13/186 175/5 |
| 4,208,878 A * | 6/1980 | Rainey | ................... | F03B 13/262 290/53 |
| 4,216,655 A * | 8/1980 | Ghesquiere | ............... | E02B 9/08 290/53 |
| 5,841,456 A * | 11/1998 | Takei | ..................... | B41J 2/0057 347/101 |
| 2003/0121255 A1* | 7/2003 | Dick | ........................ | B63B 35/44 60/398 |
| 2004/0061338 A1* | 4/2004 | Woodbridge | ....... | F03B 13/1845 290/53 |
| 2005/0230206 A1* | 10/2005 | Stewart | ................... | B60L 7/003 188/381 |
| 2007/0126239 A1* | 6/2007 | Stewart | ................... | F03B 13/20 290/53 |
| 2008/0036213 A1* | 2/2008 | Storbekk | ............... | F03B 13/186 290/53 |
| 2008/0206077 A1* | 8/2008 | Royset | ...................... | E02B 9/08 417/333 |
| 2008/0238103 A1* | 10/2008 | Montgomery | ...... | F03B 13/1865 290/53 |
| 2010/0019497 A1* | 1/2010 | Reiff | ........................ | F03B 13/16 290/53 |
| 2010/0032950 A1* | 2/2010 | Akervoll | ............. | F03B 13/1885 290/53 |
| 2010/0164227 A1* | 7/2010 | Grassi | ..................... | F03B 13/20 290/52 |
| 2010/0264659 A1* | 10/2010 | Chi | ...................... | F03B 13/1855 290/53 |
| 2010/0300223 A1* | 12/2010 | Farb | ........................ | F03B 13/16 74/35 |
| 2012/0074702 A1* | 3/2012 | Ahdoot | ................. | F03B 13/182 290/53 |
| 2012/0139261 A1* | 6/2012 | Dick | ........................ | F03B 13/20 290/1 C |
| 2012/0261923 A1* | 10/2012 | Hassavari | ........... | F03B 13/1845 290/53 |
| 2013/0140824 A1* | 6/2013 | Leijon | ...................... | B66D 1/36 290/53 |
| 2013/0188976 A1* | 7/2013 | Ueda | ........................ | G03G 15/10 399/67 |

FOREIGN PATENT DOCUMENTS

| | | |
|---|---|---|
| DE | 102008048730 A1 | 4/2010 |
| DE | 102010013199 A1 | 9/2011 |
| DE | 102010027361 A1 | 1/2012 |
| GB | 2480337 A | 11/2011 |

OTHER PUBLICATIONS

International Search Report, Application No. PCT/EP2014051824, dated Aug. 5, 2014.

* cited by examiner

Figure 7    Detail A

LINEAR GENERATOR AND LINEAR DRIVE

This is the U.S. National Phase of International Patent Application No. PCT/EP2014/051824, having an international filing date of Jan. 30, 2014, and which claims the benefit of priority of German Patent Application No. DE 10 2013 201 716.2, filed Feb. 1, 2013. The entire contents of each of the foregoing is expressly incorporated herein by reference.

FIELD OF THE DISCLOSURE

The invention concerns a device for the reversible transfer of linear motion into rotational motion and for the conversion of rotational motion into electrical energy and vice versa. In particular, the invention concerns a device which is capable of converting translational motion, e.g. oscillating lifting motion, into rotational motion and also into electrical energy in the form of electric current. Since electric current can also be used to produce rotational motion by means of an electric motor, the device according to the invention is also suitable for use as a linear drive in that the rotational motion produced by an electric current can be converted by the device into translational motion.

BACKGROUND

Numerous technical applications aim to convert a translational motion, in particular an oscillating translational motion, into a rotational motion so as to use the rotational motion to produce electric current by means of a generator. For example, the piston in a reciprocating engine is set into translational motion by the combustion of fossil fuels and by guiding the piston in a cylinder, whereby the piston transfers its translational kinetic energy via a piston rod onto a crankshaft whose rotational motion can in turn drive a generator to produce electric current. However, the use of a crankshaft implies a constant stroke as can be guaranteed by combustion engines, for example. In combustion engines, the stroke of the piston is matched with the diameter of the trajectory of the crankpin. If the translational motion is irregular, i.e. with a varying stroke, this kind of motion transfer from translational to rotational cannot be applied.

Another way of converting translational motion into rotational motion is the so-called rack-and-gear principle, whereby a translationally moving rack sets a translationally static gear into rotational motion. In the case of a piston moving in an oscillating translational manner, the oscillating motion of the rack (piston rod) via gears and implemented by means of suitably mounted freewheel units can be converted into a unidirectional rotational motion which can in turn be used by a generator to produce electrical current. Even though this type of motion conversion of straight strokes into a rotational motion is capable of converting strokes of different sizes into rotational energy, the transmission required for this purpose is mechanically complex due to the need for the two freewheel units; what is more, it is sensitive in terms of environmental conditions such as weather and therefore relatively high-maintenance. As a result, this type of motion conversion is not suitable for ensuring trouble-free operation over an extended period of time.

If the aim is to convert the power of ocean waves into electric current, sensitive systems can only be used to a limited extent to convert oscillating wave motion into a rotational motion, since rough weather conditions have a highly corrosive impact on such systems, thereby influencing them negatively in their function and efficiency. Protection such as in the form of a sophisticated mechanical system consisting of freewheel units mounted in the opposite direction, for example, is very elaborate and high-maintenance. For this reason, generating electric current from ocean waves by means of such systems is liable to disruption and requires much servicing, so the approach is often uneconomical or even unfeasible.

Ocean waves always produce a slow, vertically oriented buoyancy force as a wave crest passes through. What is more, the wave height or amplitude, i.e. the vertical difference in level between the wave trough and crest, does not remain constant. This means that the lifting motion that a floating body undergoes on the surface of the water, e.g. in the sea, is variable and will depend on the weather conditions and other environmental factors such as tides, geographical circumstances, shipping, etc. A wave power plant as described in DE 10 2008 048 730 B1 shows numerous flat floating bodies, largely arranged side by side, powered by wave motion and independently movable back and forth on guide rods in an oscillating, translational manner, i.e. up and down. The floating bodies are connected in an elastically preloaded manner to a support structure via a guide rod so that when a wave passes, the floating bodies are initially raised upwards vertically along the guide rod, acting against a spring force. After the wave has passed, the spring then moves back down along the guide rod into a wave trough with the gravity of the floating bodies.

In order to use this translational motion to generate electric current, i.e. electrical energy, it is essentially possible to apply the induction principle. This principle involves moving an electric conductor relative to a magnetic field. In order to generate a significant electric current or voltage, however, the motion must be as rapid as possible and/or a powerful magnetic field is required. However, both of these requirements are difficult to meet in a wave power plant, especially if the translational motion of the waves is to be converted directly into electrical energy. The translational motion generated by ocean waves via the floating bodies is generally too slow for efficient utilisation of the induction effect, or else a device suitable for this purpose is too elaborate and/or expensive.

Nonetheless, ocean waves are capable of producing a relatively powerful translational force which can be used to generate electrical energy after conversion into rotational motion. Here, however, implementation is not possible using a crankshaft in the case of varying wave heights as is common in open waters (see explanations above). The use of racks and gears coupled with freewheel units to convert the translational motion into unidirectional rotational motion cannot be achieved in an optimum technological and economical manner and only with great complexity due to the weather conditions and the sensitive mechanical system of the freewheel units, as explained above.

Another wave stroke power plant, which is assumed in the preamble of the invention is shown in DE 10 2010 027 361 A1. Here a wave stroke power plant is shown with a floating body guided on a guide rod which is anchored on the seabed, the floating body being raised and lowered by the waves. By the force of gravity alone, the floating body slips back down into the wave trough after the wave crest has passed. The floating body is guided by guide rollers arranged in a guide cage, whereby the guide cage, together with the guide rollers, forms two bearing points in the longitudinal direction of the guide rod. On one side of the guide rod, a rack is also arranged which interlocks with a cogwheel that is additionally positioned in the guide basket of the floating body. The gear that interlocks with the rack drives an electrical generator via a transmission with integrated freewheel units, the electrical generator also being mounted on the floating body. The electric current generated is fed by a transformer to the mainland, for example. The device shown in DE 10 2010 027 361 A1 to generate electrical energy from the lifting motion of the ocean waves exhibits numerous components, in particular electrical components, which require special protection from penetration or corrosive attack by water, in particular sea water. For this reason, the known system is high-maintenance and does not offer optimum commercial viability. For permanent operation, the device according to DE 10 2010 027 361 A1 requires a high degree of maintenance and costly precautionary measures.

From DE 695 20 678 T2, a transport carriage is known which subdivides the load-bearing body into two partial bodies, each of which is connected to a wheel. The two partial bodies are pivotally interconnected by a joint, with the rotation axis of the joint running parallel to the wheel's rotation axes and running in the plane of the wheel's rotation axes. The two partial bodies are pivotally supported by a connecting spring arrangement around the rotation axis of the joint so that the wheels are elastically pressed against the guide rail, whereby the pressing forces are adjustable. In order to drive the transport carriage, electric motors are arranged on each partial body that drive the wheels, the wheels being able to roll on opposite sides of a guide rail.

GENERAL DESCRIPTION

The invention has the objective of improving the known device according to DE 695 20 678 T2 mentioned in the preamble. The object of the invention is therefore to provide a device for reversibly converting linear motion into rotational motion and converting the latter into electrical energy and vice versa. In particular oscillating translational motion, as originating from ocean waves, for example, or from elastically mounted baffles that are capable of being set in a translational motion by air pressure waves, is to be converted by the devices according to the invention into electrical energy. In general, the object is to convert slow, powerful linear motion into electric current and vice versa. Conversely, the device is to be capable of acting as a linear drive from a supply of electrical energy. Constrained movement of the linear distance travelled, speed and/or force is to be implemented in a simple manner by means of controlled stepper motors.

What is more, the invention aims to configure the structure and design of the device to be simple, reliable, robust and low-maintenance. In particular, the invention is to achieve the object of realising a device for generating electrical current which can operate in wave power plants over long periods on a maintenance-free basis, especially in the offshore domain under extreme weather conditions. Furthermore, the object of the invention is to provide a low-cost device which is structured as simply as possible from a few parts. In addition, the invention sets out to minimise maintenance and, where maintenance is required, to ensure that individual components are easily accessible and simple to service.

The objects set by the invention are achieved by a device, whereby a reversible linear motion, in particular an oscillating lifting motion, is converted into rotational motion for conversion into electrical energy.

For reasons of clarity alone, the invention will be described using the example of a wave power plant as known from DE 10 2008 048 730 B1, for example. However the device according to the invention is not limited to this embodiment, but is preferably capable of being used in all applications in which a translational force is to be utilised to generate electrical energy, or vice versa, when a linear drive powered by electrical energy is to be used. The use of the device according to the invention described in the following in exemplary fashion therefore purely serves to provide a clear practical example which is simply one of numerous preferred application possibilities.

The device according to the invention comprises a central rail and a support element surrounding the central rail, the support element being arranged so as to be capable of performing a linear motion relative to the central rail in the longitudinal direction of the central rail. A number of rolling bodies or elements in contact with the central rail are rotationally mounted in the support element in such a way that the rolling elements roll on the central rail during the relative (oscillating) linear motion of the support element vis-á-vis the central rail in conjunction with the central rail, whereby the linear motion of the support element or the central rail is converted into rotational motion of the rolling elements. The rotational motion of at least one of the rolling elements forms the drive of an electric machine. In the case of the embodiment of the device according to the invention as a linear drive, the supply of electrical energy to the electric machine of at least one rolling element generates a rotational motion which is converted by the rolling element into a translational motion of the central rail relative to the support element by means of rolling on the central rail.

According to the invention, therefore, the linear motion of the central rail or the support element is connected via at least one rolling element to an electric machine. In a preferred embodiment, the electric machine is integrated in the rolling elements, which take the form of generators or electric motors. Here, at least one rolling element comprises a rotating wheel, for example, to generate electric current or drive the central rail or support element, the rotating wheel being in contact with the central rail. Inside such a wheel, configured as the rotor of an electric machine, a stator of the electric machine can be formed in a hub section of the rolling element which is static in relation to the wheel. Via non-rotating axial ends or protrusions, for example axle stubs, electric current can be drawn from the generator or fed to the electric motor. The protrusions, preferably configured as being concentric with the hub section, can also simultaneously serve to mount the rolling elements in the support element.

It goes without saying that all rolling elements mounted in a support element can constitute such an electric machine, however for the function or realisation of the device according to the invention, it is sufficient for one rolling element to be configured as an electric machine. In another embodiment, three rolling elements configured as electric machines are arranged in such a way that the contact points or lines of the rolling elements are on a plane with the central rail which is vertical to the central rail's longitudinal axis. In the case of three rolling elements, the rotation axes of two neighbouring rolling elements form an angle of 120°, so that the rolling elements create a stable three-point guide for the central rail. It is obvious to the person skilled in the art that such a guide can also be formed by two or three rolling elements, whereby the angle between the two rotation axes of neighbouring rolling elements should preferably be equal to 360° divided by the number of rolling elements. In the case of two rolling elements mounted in a support element, therefore, the rotation axes would be parallel.

In order to ensure secure mounting and guidance of the central rail by the rolling elements, the running surface of the rolling elements can be configured with a circumferential groove, such as a U-shaped or V-shaped groove, in particular where two or three rolling elements are used in a support element, since this gives the guidance of the central rail between the rolling elements improved lateral stability. From an arrangement of three or more rolling elements in a support element, the wheels or their running surfaces can be configured to be planar in the axial direction of the rolling elements since in this case an angle of less than 180° between the rotation axes of two neighbouring elements creates sufficient stabilisation of the central rail to prevent it from slipping out of the guidance between the rolling elements.

What is more, according to the invention the rolling elements are elastically preloaded against the central rail, thereby preventing the running surface of the rolling elements from lifting off the peripheral surface of the central rail. Due to the fact that the rolling elements in the support element are elastically preloaded to exert pressure on the central rail, the central rail is essentially mounted with zero clearance.

The rolling elements are preferably arranged in the support element in such a way that the preload forces on the central rail cancel each other out. In this way, high to very high preload forces can be applied without the rolling resistance of the rolling elements on the central rail being excessively increased. The contact pressure of the rolling elements can be very high, similar to the weight load of a tyre on a railway carriage or of a locomotive on a railway track, whereby the translational mobility between the (central) rail and the support element (carriage or locomotive) is very smooth-running. Furthermore, high levels of contact pressure—preferably the same elastic force should essentially be applied to each rolling element—ensure that all translational motion between the central rail and the support element is converted by the rolling body into a rotational motion of the rolling bodies or the rolling elements, preferably free of slip. Conversely, this means that in the case of powered rolling elements, a translational motion of the central rail and the support element results from the rotary drive. Even in the case of wear and tear of the central rail and rolling elements, there is no change in the clearance-free, slip-free guidance and transmission of the force, since the elastically preloaded and powered unit comprising the rolling elements mounted in the support elements and the central rail compensate for the abrasion and wear between the rolling element and central rail without significant loss of preload force.

What is more, a simple change/reduction in the diameter of the rolling elements can be applied to easily adapt the device to use with linear motion of differing speeds. The rotational speed of the rolling elements can be mechanically altered by adapting the diameter, which results in a given power transmission with faster or slower rotating rolling elements (dynamos/electric motors) capable of being converted into electric current. In this way, the use of copper and rare earths in the magnets required for the induction can be optimised for slow linear motion, thus permitting significant reduction as compared to conventional linear induction generators.

The rotational motion of at least one rolling element can reliably form the drive or output of an electric machine in this way. It goes without saying that the inventive concept also includes all or just some of the rolling elements being configured as electric machines. Here the rolling elements perform several functions at the same time, namely that of guiding the central rail in a longitudinal direction and also that of converting the translational motion into rotational motion and vice versa. A third function of the rolling elements, if they are configured as electric machines, can also be to convert the kinetic energy into electrical energy and vice versa. Alternatively, the rolling elements/bodies can be connected to suitable electric machines by means of a rotatory coupling.

Via the elastic contact forces, the rolling elements are pressed against the guide rail which is positioned between them and they rotate as soon as a translational motion of the central rail occurs in relation to the support element. Preferably, the rolling elements here are rolling bodies or wheels made of a metallic material or plastic and are inert to sea water or salt water or are not subject to corrosion, for example, or at least only to a slight degree. The central rail should preferably also be made of the same metallic material or plastic as the rolling elements or their running surface. Here, the material of the central rail and running surfaces of the rolling elements must withstand the elastic contact forces with which the rolling elements are stabilised against the central rail and must also be resilient to sea water and the other conditions of use.

The rail-wheel principle—similar to the wheel of a locomotive on a railway track—is familiar from the state of the art in terms of its high level of efficiency in converting rotational motion into translational motion and vice versa and in terms of its good resilience to weather conditions. However, it is not known from the state of the art that this rail-wheel principle is also suitable for guidance in the longitudinal direction of the rail when several wheels are arranged along the rail. Neither is it known from the state of the art that guide rollers, in particular force-actuated guide rollers, as provided for in the invention, can be configured as electric machines or connected to electric machines, whereby electric current can be generated or a linear drive created at the same time as converting translational motion into rotational motion or vice versa.

In another embodiment, the device according to the invention can be operated with statically fixed rolling elements and a central rail which is movable relative to them. Applied to the wave power plant known from DE 10 2008 048 730 B1, this means that the central rail can be connected to a floating body in such a way that the central rail can be moved vertically up and down in an oscillating motion through the displacement of the floating body by the ocean waves. The support element of the device according to the invention is attached statically to the support structure of the wave power station, for example, and the rolling elements arranged in the support element guide the central rail in a longitudinal direction. The central rail or guide rod that is moved translationally relative to the support element and the support structure of the wave power plant sets the rolling elements in a rotational motion, whereby the rolling elements can produce electrical energy if they are configured as generators, for example.

In another embodiment of the wave power plant according to DE 10 2008 048 730 B1, the guide rod can be attached permanently to the support structure of the wave power plant and the floating body can be guided vertically or in the direction of amplitude of the wave via the rolling elements on the guide rod. The vertically oscillating motion of the floating body causes the rolling elements to roll along the guide rod. The rotational motion of the rolling elements, as shown in the above example, can be used to generate electric current.

In both cases, therefore, the rolling of the rolling elements on the guide rod converts translational motion into rotational motion. The rolling elements perform the function of converting translational energy into rotational energy and also a guidance function in a longitudinal direction along the guide rail, especially where three or more rolling bodies or elements are arranged in one support element.

Here, propulsion of the guide rod by ocean waves is only one potential form of propulsion for the device according to the invention, and any other form of propulsion for the translational displacement of the guide rod or support element can be used to generate electric current with the device according to the invention. Here it is indifferent whether the guide rod is displaced by a piston engine or via elastically mounted baffles by means of air pressure waves or by means of water waves.

In order to enhance the lateral stability of the guide rod or central track, i.e. across its longitudinal axis, an additional guide bearing is placed longitudinally to the central rail and spaced apart from it so that the motion of the central rail relative to the support element is essentially only possible in the direction of its longitudinal axis. This second guidance point will preferably also be configured with a device according to the invention comprising a support element and rolling elements arranged inside it which are pressed to the central rail by means of a contact pressure, as is the case with the first bearing point as described in the explanation above. In the simplest case, the second bearing point of a central rail will be configured with an identical support element and identical rolling elements, though this is not absolutely necessary. Depending on the specific application, however, each bearing point of a central rail can be configured in a way which is optimum for its particular use.

In other applications of the device according to the invention, numerous support elements with rolling elements arranged inside them can be placed in the longitudinal direction of the central rail, the individual support elements being connected to each other. This is especially preferable where the connections between the support elements are not only configured as a force fit but also as an electrical connection to transmit the electric current generated to a consumer or energy storage unit between the support elements. In particular where electric current is to be transmitted via several support elements connected in series with rolling elements arranged inside them, the support element will preferably be configured in two sections, and these two sections of the support element will be insulated from each other so that each partial support can generate one polarity of the electric current generated.

In another embodiment, the support elements are configured in such a way that they comprise two retaining brackets for each rolling element, by means of which the rolling elements can preferably be mounted on the axial ends in the hub section. Here it is preferable that the clear gap between the rolling elements before insertion of the central rail should be smaller than the
diameter or cross section of the central rail. In this way, the retaining brackets for the rolling
elements are elastically deformed when the central rail is inserted, thereby pressing against the central rail with an elastic force. An end stop on the rolling elements can prevent the retaining brackets from deforming beyond the elastic deformation range. Firstly, this provides assembly reliability and secondly it prevents damage to the device according to the invention in the case of powerful lateral forces, as well as limiting displacement beyond a certain desired point. What is more, such an arrangement of the rolling elements ensures automatic wear and tear compensation since within the range of elastic deformation of the retaining brackets, the rolling elements can automatically compensate for any changes in diameter to the rolling elements or central rail caused by wear and abrasion.

In another preferred embodiment, the retaining brackets are configured as being integrated in the support element and the deformation end stop to avoid plastic deformation of the retaining brackets forms part of the support element. Here, the travel for elastic displacement capacity should be such that good longitudinal guidance of the central track is ensured.

In many cases, a rod-shaped body with a circular cross-section will be selected as a central rail, whereby tubes can be preferably used in such cases for reasons of weight and stiffness. However, the device according to the invention can also be used with guide rails which have a rectangular cross section or a polygonal cross section. The surface or peripheral surface or lateral surface of the central rail and that of the raceways of the rolling elements should be selected for optimum friction so as to keep the rolling friction between the central rail and the rolling elements to a minimum. Due to the high mutually cancelling contact forces, a metal/metal pairing is suitable for the central rail and the raceways of the rolling elements in rough conditions of use. Due to the high contact forces that can be produced by support elements of appropriate stiffness—similar to the wheel of a railway carriage on a railway track—it is possible to ensure virtually non-slip rolling motion of the rolling elements on the central rail. The use of plastic pairings is certainly conceivable too, provided creep resistance is guaranteed. The inventive concept does not exclude a plastic/metal pairing, or the use of rubber or ceramics. The present invention is not limited to the selection of specific materials for the rolling mechanism.

Figure 2A:
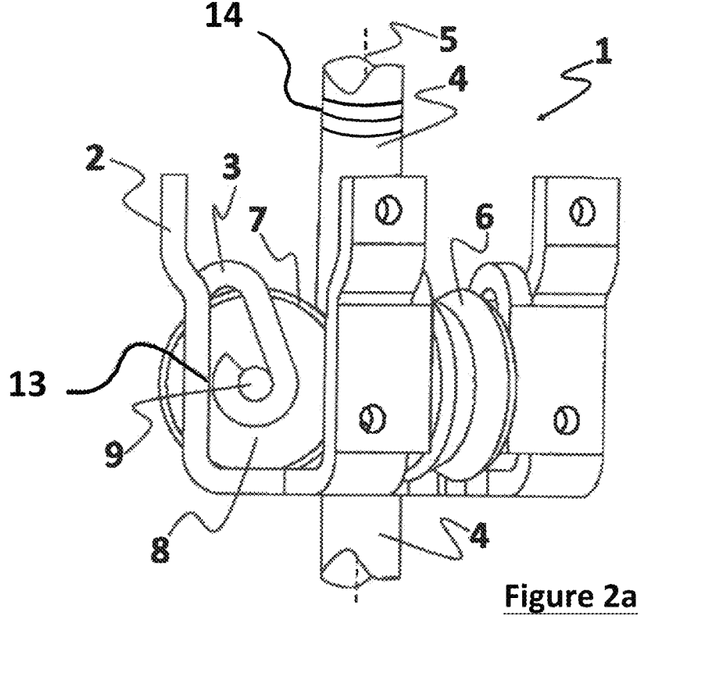
FIG. 2a shows a side view of the embodiment according to FIG. 1.
Figure 2B:
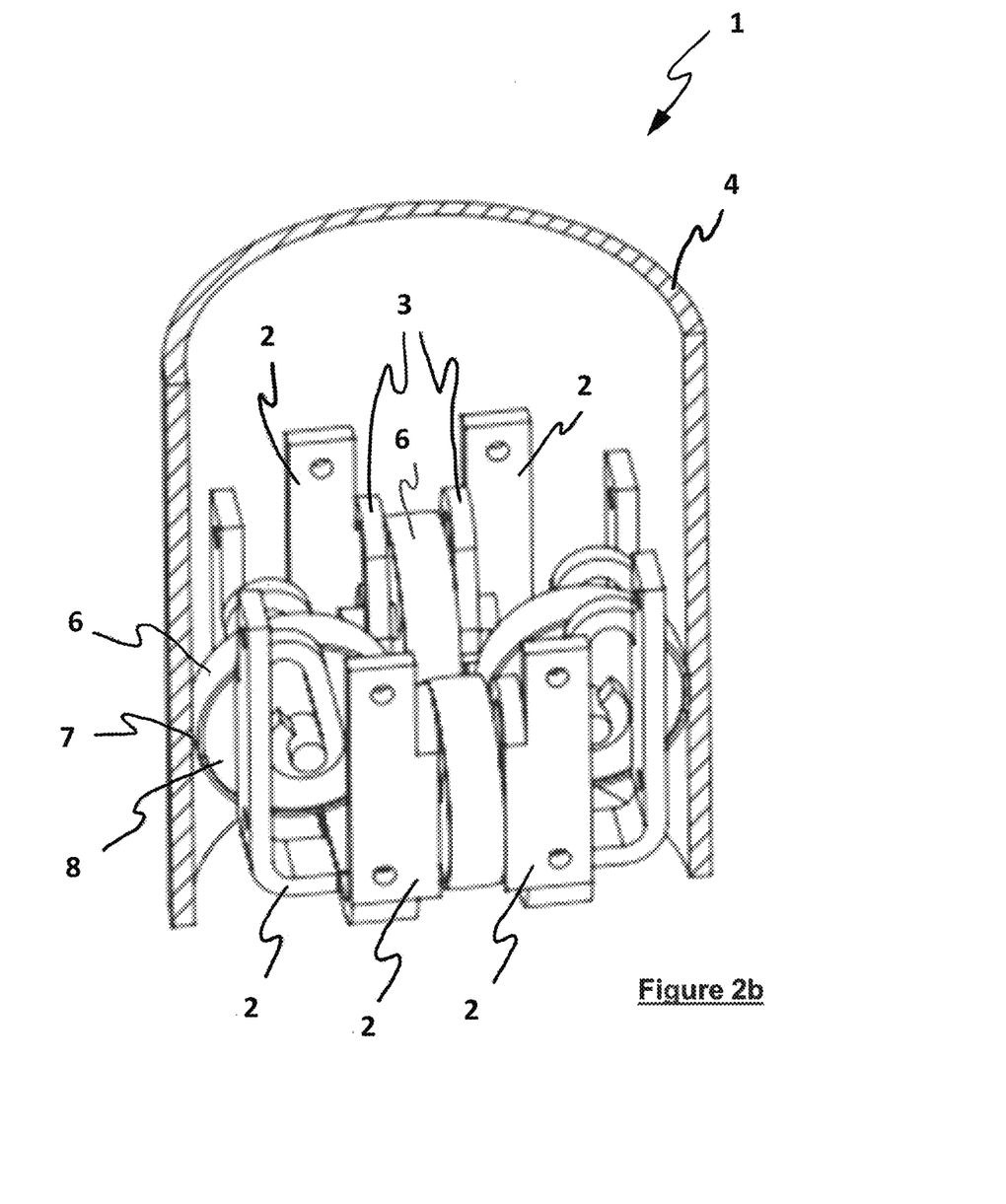
FIG. 2b shows a perspective view of a second embodiment of the device according to the invention.

Nor is the invention limited to the support element surrounding the central rail; for the person skilled in the art it goes without saying that the central rail and the support element can be configured in such a way that the central rail takes the form of a tube or in general that of a hollow profile, for example, that surrounds the support element as shown in FIG. 2b. In such an embodiment encompassed by the invention, the rolling elements press against an inner surface of the hollow profile by means of elastic preloading. In this case, the relative translational motion between the central rail and support element takes place inside the hollow profile. Such an arrangement is therefore simply a variation in the design of the previously described embodiments. The operating principles are preserved in terms of generating electric current, in particular as resulting from the conversion of oscillating translational motion into rotational motion. The same applies to the linear drive according to the invention, which according to this embodiment is positioned inside the hollow profile, with linear motion being exhibited by the hollow profile or by the support element stabilised inside the hollow profile by means of the rolling elements.

Furthermore, the invention is not limited to the surface texture of the central rail or rolling elements. For example, it is conceivable that the surfaces are roughened, fluted or furnished with a toothed profile 14, whereby the running surfaces of the rolling elements exhibit matching surfaces. This means that the rolling elements are configured as a kind of cogwheel with cogs that interlock with the toothed profile, for example on a guide rail exhibiting numerous peripheral grooves. In order ensure the function of the device according to the invention, the only essential requirement is for motion to be capable of being transferred from the central rail to the rolling elements, whereby this can be effected just as well by means of frictional forces with the appropriate contact pressure as it can by means of an appropriately configured positive fit of the component modules or components involved.

BRIEF DESCRIPTION OF THE DRAWINGS

In the following, preferred embodiments are described in detail for the purpose of illustration, without limiting the inventive concept, as follows.

DETAILED DESCRIPTION OF THE DRAWINGS

Figure 1:
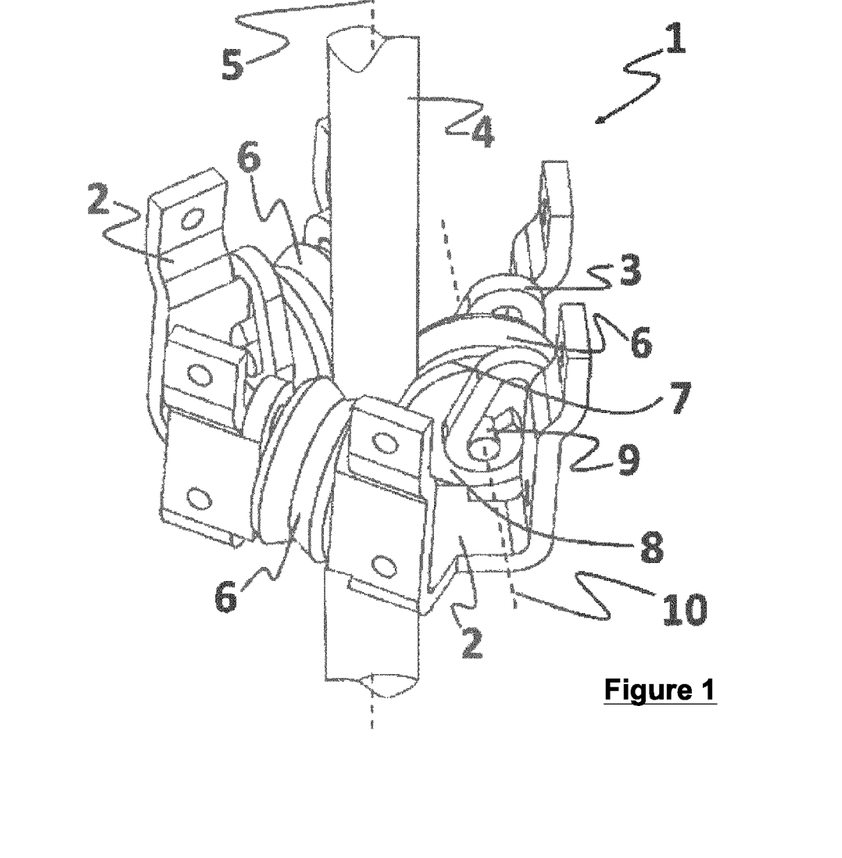
FIG. 1 shows a perspective view of a first embodiment of the device according to the invention.

The embodiment in FIG. 1 shows the device according to the invention with a support element 2, which in this embodiment has the basic shape of a ring in which three rolling elements 6 are arranged and which surrounds a central rail 4. Each of the three rolling elements 6 is in contact with the central rail 4 and is mounted with axial ends 9 in retaining brackets 3 of the support element 2. By notionally shifting the central rail 4 along the longitudinal axis 5 in relation to the support element 2, or by notionally shifting the support element 2 along the longitudinal axis 5 of the central rail 4 in relation to the central rail 4, the rolling elements 6 roll along the peripheral surface of the central rail 4.

The rolling elements 6 shown in FIG. 1 can be configured in such a way that they comprise a wheel 7 that is in contact with the central rail 4, whereby the rotation axis 10 of the wheel 7 is the same as the rotation axis of the rolling element 6. Inside the wheel 7 there is a coaxial hub section 8 comprising axial ends 9 in which the retaining brackets 3 of the support element 2 are mounted in a non-rotating manner so that the hub section 8 does not rotate or move in relation to the wheel 7 or the support element 2. In this exemplary arrangement, the wheel 7 can be configured as a rotor and the hub section 8 as a stator of an electric machine.

In the preferred embodiments shown in FIGS. 1 to 5, the rolling element 6 is configured as a wheel 7, though this is not absolutely necessary for the basic function of the device according to the invention, since the rolling elements 6 can also be rotationally mounted in the support element 2 as solid rolling bodies and appropriately connected to an electric machine to provide its rotary drive or output. For the sake of simplicity, the present invention will refer to rolling elements 6, even though these are configured as wheels 7 as shown in exemplary fashion in the figures.

Figure 6:
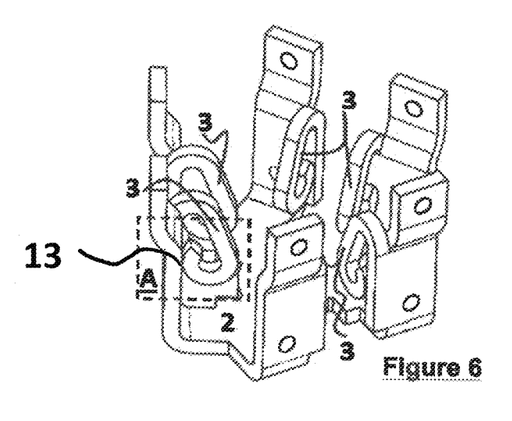
FIG. 6 shows a perspective view of a support element according to the invention configured as a single component.

According to the invention, the rolling elements 6 are simultaneously pressed with elastic preload forces against the central rail 4 in such a way that the central rail 4 is bearing-mounted on the rolling elements 6. This should preferably be at a bearing level 10 and in such a way that the individual preload forces cancel each other out (cf. FIG. 2). The elastic preload forces are produced in the embodiments shown in the figures via the retaining brackets 3, which are elastically deformed on assembly, i.e. when the central rail 4 is passed through the rolling elements 6 which are peripherally arranged along the central rail 4. The retaining brackets 3 are preferably configured to be integral to the support element, i.e. forming a single component (cf. FIG. 6). Furthermore, the support element 2 is preferably a sheet metal part which can be produced in simple series production. The example of a support element 2 in FIG. 6 shows that the retaining brackets for the rolling elements 6 are made from sheet metal strips which are suitably rolled (curved) so that the axial ends 9 of the rolling elements can be mounted in them.

Figure 7:
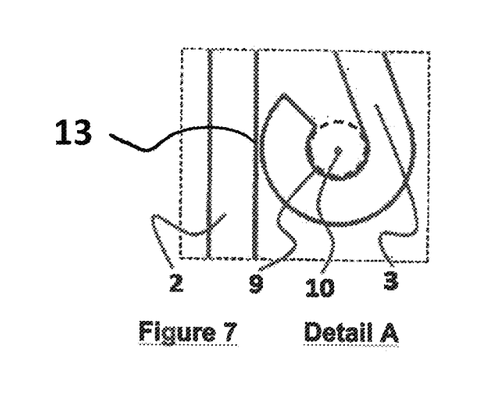
FIG. 7 shows a detail view A of the support element according to FIG. 6 with an axial end of a rolling element according to the invention mounted in a retaining bracket.

After mounting the rolling elements 6 in the retaining brackets 3, i.e. before attaching the assembly group—support element 2 and rolling elements 6—to the central rail 4, the end sections of the retaining brackets 3, on which the axial ends 9 of the rolling elements 6 are mounted, are spaced from the base body of the support element 2. In this way, the retaining brackets 3 can elastically deform when the central rail 4 is mounted/inserted, causing the preload forces required according to the invention to be applied to the central rail 4 via the rolling elements 6 (cf. FIG. 7). Appropriately, end stops 13 to limit the elastic deformation of the retaining brackets 3 are provided on the support element 2 so that the retaining brackets 3 cannot plastically deform during assembly or if a lateral force is applied to the central rail 4, which would result in loss of the preload forces. The end stops 13 provided on the base body of the support element 2 are preferably not reached by the retaining brackets 3 even when the central rail 4 is in its assembled state (cf. FIG. 7) so that the central rail 4 is elastically mounted transversely to its longitudinal direction. The spring travel which can be covered by the elastic mounting of the central rail 4, i.e. the deformation of the retaining brackets, should only be great enough to ensure that in every operating state of the device according to the invention, the running surfaces 7 of all rolling elements 6 are applied with a force to the central rail 4 at all times. However, it should also be great enough to be able to compensate for abrasion-related wear and tear to the central rail 4 and the rolling elements 6.

Figure 3:
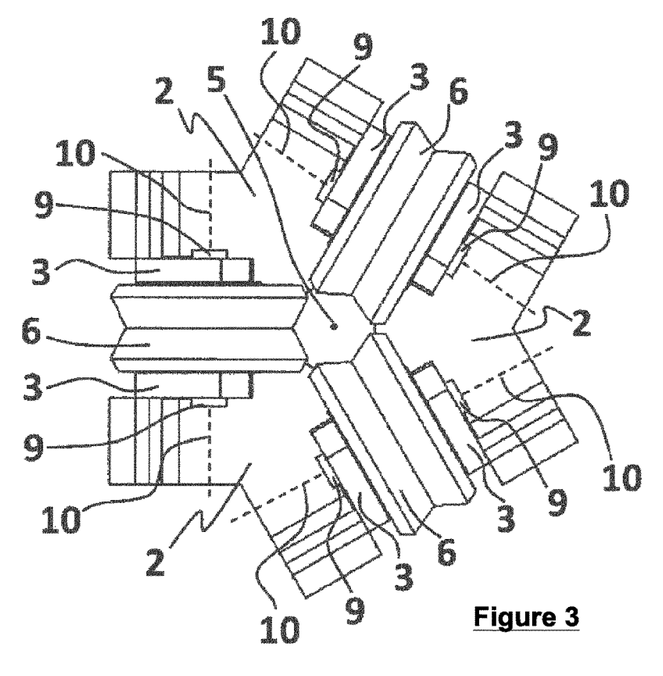
FIG. 3 shows a top view of the embodiment according to FIG. 1 without central rail.

In the embodiments of the device according to the invention shown in FIGS. 1 to 3, three rolling elements 6 are mounted on a support element 2 in such a way that the rotation axes 10 of the rolling elements 6 or their running surfaces 7 lie in a plane, each one forming an angle of 120° with the neighbouring rotation axis 10. This three-point bearing is characterised in that it forms a stable centring of the central rail 4 with a small number of components, whereby the contact forces of the rolling elements 6 against the central rail 4 cancel each other out. In the example shown in FIGS. 1 to 3, the rolling elements 6 additionally have a hollow groove on their running surface so as to increase lateral guidance. This type of hollow groove or keyway is not absolutely necessary, but such a feature is advisable in case of the arrangement of only two rolling elements 6 in the support element 2 so as to achieve stable lateral guidance.

Similar to the example in FIGS. 1 to 3, the device according to the invention can also be configured with four rolling elements 6 arranged at an angle of 90°, for example. With a slightly larger number of components required, the translational motion fed into or out of the device according to the invention for conversion into rotational motion can be distributed across four rolling elements or bodies in this way. The number of rolling elements 6 used in a support element 2 is not limited by the inventive concept and can be selected according to the specific application in question. The only aspect that is essential to the invention is that the rolling elements 6 are pressed by a force against the central rail 4 so that a translational motion of the central rail 4 or the support element 2 results in a rotational motion of the rolling elements 6 or, vice versa, the rotary drive of the rolling elements 6 reliably results in a translational motion of the central rail 4 or the support element 2. Here, the rolling elements 6 are to be arranged in the support element 2 in such a way that their pressing forces cancel each other out so that the translational motion can occur with the least possible rolling friction.

As can be observed especially well in FIG. 2, it is not relevant to the function of the device according to the invention whether the central rail 4 or the support element 2 performs the translational motion providing the other component remains fixed in each case. In other words, it is does not matter in terms of the function of the device according to the invention, i.e. for the realisation of the inventive concept, if the support element 2 is moved along the central rail 4 or guide rod 4, or if the central rail 4 is shifted through the support element 2 along its longitudinal axis 5. In both cases a rolling motion of the rolling elements 6 is effected on the central rail 4, which can freely engage in translational motion due to the rolling elements 6, while the rotating running surfaces 7 of the rolling elements 6 convert the rotational energy into electrical energy or vice versa. In the case of operation of the device according to the invention as a linear drive, the rolling elements 6 with wheel 7 and hub section 8 are configured as electric motors which, when electric current is applied, set the wheels 7 in a rotational motion, rolling on the central rail 4 to cause the latter to perform a translational motion if the support element 2 is fixed.

When the device according to the invention is in operation, i.e. in the case of translational motion of the central rail 4 or of the support element 2, the electric current which can be generated by the rolling of the wheels 7 on the central rail 4 relative to the non-rotating hub sections 8 can be collected at the axial ends 9 of the rolling elements, for example, and transmitted. Preferably, an electrical polarity—plus or minus—will be collected on each side of the rolling elements 9. When a translational force is applied to the central rail 4 or the support element 2, the rolling elements 6 act like hub dynamos such as those used in bicycles, for example. However, when the device according to the invention is in operation, in a wave power plant for example, the translational direction of motion changes in an oscillating manner, which in the device according to the invention results in a change in the rotational direction of the rolling elements 6, thereby changing the polarity of the electric current generated.

When the device is used in a wave power plant as described above, the wheels 7 of the rolling elements 6 rotate in opposite directions when the floating body is raised and lowered. This change of rotational direction can either be used to generate alternating current or else it can be compensated by means of a change of polarity inside the generator so that a direct current can be collected at the axial ends 9. The direct current produced in this case can be used directly to charge a capacitor or another electrical storage device such as an accumulator. In both cases, when generating either direct current or alternating current, the electric current generated can also be supplied directly to a consumer. The supply of generated alternating current to an electric storage device which converts the electrical energy into potential energy, for example, is equally embraced by the inventive concept as is the transmission of direct current.

Figure 4:
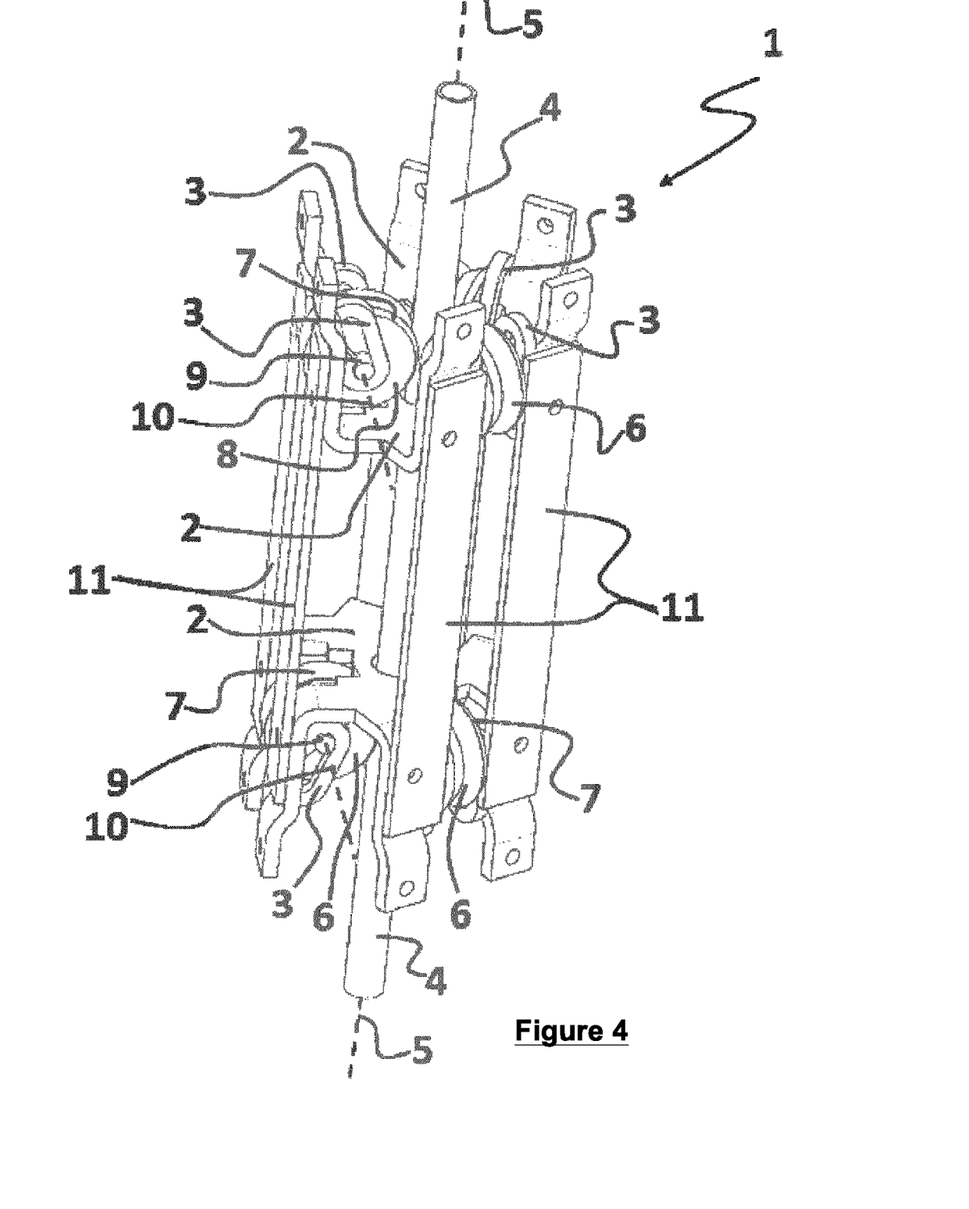
FIG. 4 shows a perspective view of a second embodiment of the device according to the invention with two support elements forming two bearing points for longitudinal guidance of the central rail.

FIG. 4 shows the example of a second embodiment of the device according to the invention in which the two support elements 2 with rolling elements 6 mounted inside them are spaced apart along the longitudinal direction of the central rail 4, thereby forming two bearing points for the central rail 4. The embodiment shown in FIG. 4 goes beyond the fundamental embodiment shown in FIGS. 1 and 2 in that the central rail 4 in the device according to the invention is guided in its longitudinal direction by the device according to the invention. Two groups of elastically preloaded rolling elements 6 press against the central rail 4, forming two bearing points in the longitudinal direction 5 of the central rail 4. Each of the bearing points can be configured as described above for the single bearing point, whereby the two support elements 2 can also be connected by means of connecting elements 11. In this embodiment, too, it is immaterial in terms of the function of the device according to the invention whether the central rail 4 or guide rail 4 or the support elements 2 are moved translationally while the other component in each case remains at a standstill relative to the translational motion.

Thus the floating body in the exemplary application case of a wave power plant—for example as is known from DE 10 2008 048 730 B1—can be permanently attached to the central rail 4 of the device according to the invention, whereby buoyancy of the floating body stimulated by a wave causes the guide rod, i.e. the central rail 4, to be moved translationally in the device according to the invention. The support elements 2 with rolling elements 6 arranged inside them are statically fixed to the wave power plant. If on the other hand the floating body is attached to the support elements 2 or the connection elements 11 and the central rail or the guide rod 4 is statically fixed to the wave power plant, the support elements 2 can move translationally in relation to the central rail 4 when the floating body is raised by a wave. In both cases, the rolling elements 6 roll along the central rail 4, whereby the rotational motion caused by this provides the drive or output of an electric machine.

Figure 5:
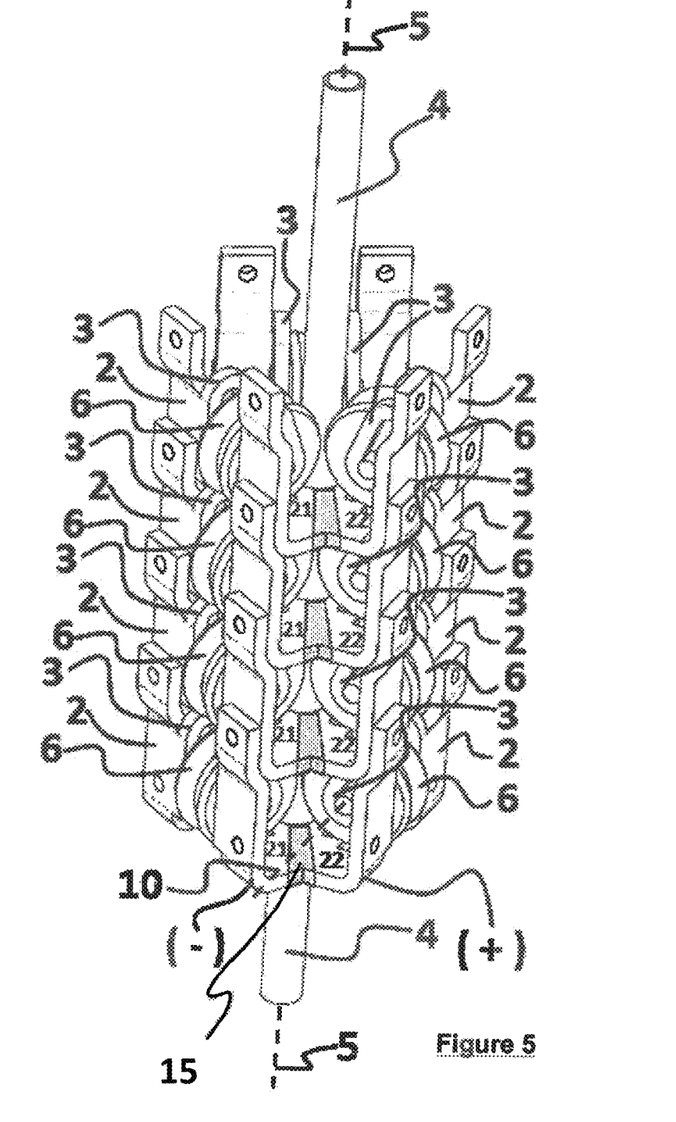
FIG. 5 shows a perspective view of a third embodiment of the device according to the invention with several support elements connected in series with rolling elements arranged inside them.

FIG. 5 shows a logical elaboration of the device according to the invention whereby numerous support elements 2 with rolling elements 6 mounted inside them are arranged along the central rail 4. Two neighbouring support elements are suitably arranged such that they are directly connected to one another. The arrangement of numerous support elements 2 with rolling elements 6 mounted inside them increases the weight of the device according to the invention, but this enables it to generate a greater force from the wave.

Figure 8:
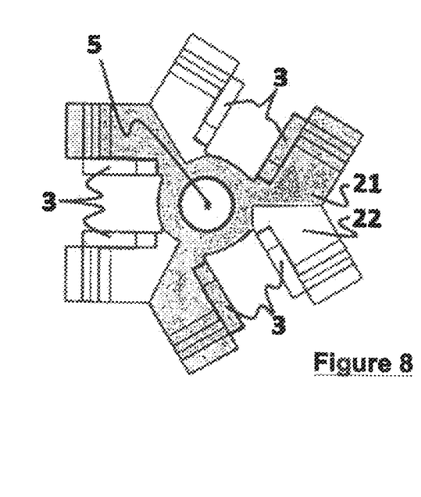
FIG. 8 shows a top view of a support element according to the invention configured as a dual-section component.

A preferred embodiment of the support element 2 is shown in FIG. 8, whereby the support element 2 is configured as a dual-section component in such a way that the first axial ends 9 of the hub sections 8, for example those on the left-hand side of the rolling elements 6, are mounted on a first partial support 21, and the axial ends 9 of the hub sections 8 on the other side, for example on the right-hand side of the rolling elements 6, are mounted on a second partial support 22. Here, the two partial supports 21 and 22 are electrically insulated 15 from each other so that they form a support element 2 according to the invention. If electric current can be drawn from the axial ends 9 of the hub sections 8 by means of the device according to the invention as described in the example above, each partial support is only connected to one electrical pole of the device according to the invention. Therefore only one electrical contact point is required for each of the partial supports 21 and 22 in order to transmit or draw or supply electric current from or to the device according to the invention so as to transmit electric current from or to all rolling elements 6. In this way it is possible to avoid having to wire each individual rolling element 6, and the electrical contacting can be configured in a significantly simpler and more compact way.

In the embodiments according to FIGS. 4 and 5, where the device according to the invention comprises more than one support element 2, the first partial support 21 and the second partial support 22 of each of the multiple support elements 2, where the support element 2 is a dual-section component, can each be interconnected in an electroconductive manner so that it is possible to draw electricity via a cable connected to the device according to the invention by means of a single contact point for the plus pole and a single contact point for the minus pole on one of the numerous support elements 2 or partial supports 21 or 22. This further reduces the number of components required. Here, the first partial supports 21 and the second partial supports 22 are preferably mutually identical (interchangeable parts). The first partial supports 21 and the second partial supports 22 are preferably configured to be symmetrical to each other, for example forming matching left-hand and right-hand parts.

Figure 9:
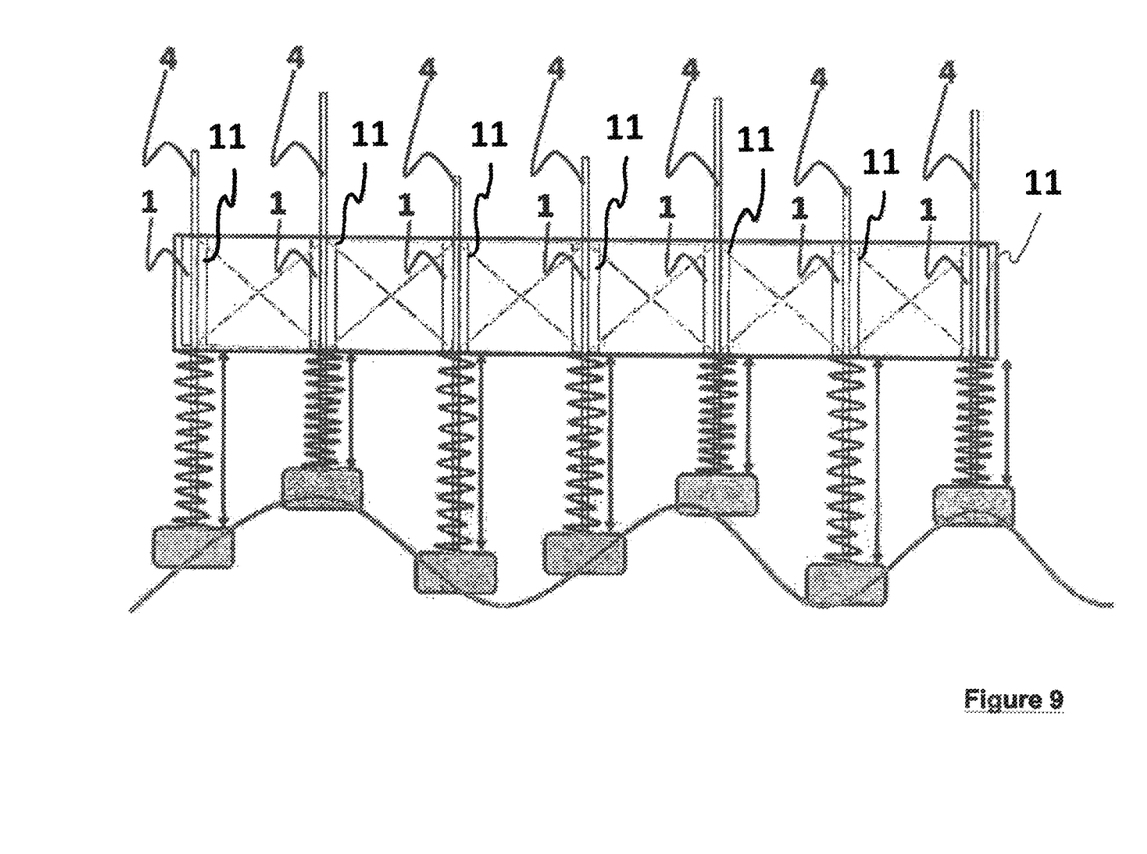
FIG. 9 shows an exemplary application of the device according to the invention with the example of a wave power plant according to DE 10 2008 048 730 B.

FIG. 9 schematically shows the wave power plant according to DE 10 2008 048 730 B1 whereby the floating bodies 12 which are raised and lowered by the water waves are permanently attached to the respective guide rails 4, the latter constituting the central rails 4, whereby the guide rails 4 are set into a vertically oscillating motion by the water waves. Here, each of the guide rails 4 represents a central rail 4 of the device according to the invention, and a device according to the invention is provided for each guide rail 4. The support elements 2 with the rolling elements 6 mounted inside them, are permanently attached to the support structure spanning the wave power plant. According to the invention, the oscillating vertical motion of the central rails 4 sets the rolling elements 6 or their wheels 7 in a rotational motion, by means of which the rolling elements 6 configured as generators or dynamos produce electric current which can be drawn from the individual devices according to the invention and transmitted. However, the application example of the device according to the invention described here merely illustrates a wide range of other potential applications of the device according to the invention and does not limit the extent of protection of the inventive concept.

The invention claimed is:
1. Device (1) for the reversible transfer of linear motion into rotational motion and for the conversion of rotational motion into electrical energy and vice versa, the device comprising:
a central rail (4),
a support element (2) which surrounds the central rail (4) or is being surrounded by the central rail (4) and which is positioned so as to be capable of performing a linear motion relative to the central rail (4) in the longitudinal direction of the central rail (4), and
several rolling elements (6) capable of rotating around rotation axes (10), which, in contact with the central rail (4), are rotationally mounted in the support element (2), whereby the rolling elements (6) perform a rotational motion in conjunction with the central rail (4) during the linear motion of the support element (2) relative to the central rail (4),
whereby the linear motion is connected to the drive or output of an electric machine, the central rail (4) is essentially mounted free of clearance under pressure on elastically pre-loaded rolling elements (6) and the rolling elements (6) are arranged in such a way that the preload forces cancel each other out and that the rotational motion of at least one of the rolling elements (6) forms the drive or output of the electric machine,
the support element (2) comprises retaining brackets (3) to hold the rotation axes (10) of the rolling elements (6), being elastically deformed in such a way that the rolling elements (6) are pressed by the retaining brackets (3) against the central rail (4) under an elastic preload force.

2. Device (1) according to claim 1, in which at least one rolling element (6) forming the drive or output of the electric machine comprises a wheel (7) in contact with the central rail (4) which exhibits a co-axial hub section (8) that remains stationary in relation to the wheel (7) and has axial end sections (9), the latter pointing in the direction of the rotation axis (10) of the wheel (7) and acting as a mount for the rolling element (6) in the support element (2), whereby the wheel (7) forms a rotor and the hub section (8) forms a stator of the electric machine and whereby electric current can be drawn from the electric machine or supplied to the electric motor via the axial end protrusions (9).

3. Device (1) according to claim 1, in which the support element (2) comprises an end stop (13) for limiting the deformation of the retaining brackets.

4. Device (1) according to claim 1, in which the central rail (4) comprises a round or polygonal cross section and is toothed or fluted transversely to the longitudinal direction at least in partial sections of a peripheral surface, whereby the rolling element (6) which rolls on this peripheral surface essentially forms a complementary peripheral surface.

5. Device (1) according to claim 1, in which the device (1) comprises more than one support element (2) with rolling elements (6) arranged inside it to form a linear guidance for the central rail (4).

6. Device (1) according to claim 1, in which the support element (2) forms a single component.

7. Device (1) according to claim 1, in which the support element (2) is a dual-section component such that one partial support of the support element (2) holds the axial end sections (9) of the rolling elements (6) on a first side of the rolling elements (6) and a second partial support of the support element (2) holds the axial end sections (9) of the rolling elements (6) on the second, opposite side of the rolling elements (6), whereby the first partial support (21) and the second partial support (22) are electrically insulated from each other.

8. Device (1) according to claim 7, in which the first partial supports (21) and the second partial supports (22) of the support elements (2) are electrically connected to one another.

9. Device (1) according to claim 1 in which, in case the support element (2) surrounds the central rail (4) the clear gap between the rolling elements (6) before insertion of the central rail (4) is smaller than the diameter cross section of the central rail, and in case the central rail (4) surrounds the support element (2), the rolling elements (6) press against an inner surface of the hollow profile by means of elastic preloading.

10. Device according to claim 1, in which the central rail (4) or the support element (2) can be shifted in a linear motion relative to the respective other component by means of a force acting essentially in the longitudinal direction of the central rail (4), and the electric machine is an electrical generator.

11. Device according to claim 10, in which the device for generating electrical current (1) is a wave or pulse power plant and the linear relative motion between central rail (4) and support element (2) the longitudinal direction of the central rail (4) is effected by means of a floating body which forms a force fit with the central rail (4) or the support element (2), whereby the floating body can be set in a linear oscillating motion by a wave motion or air pressure wave.

12. Device according to claim 10, in which the floating body forms a force fit with the support element (2), and the support element (2) or the support elements (2) with the rolling elements (6) mounted inside them are mounted at least in a splash-proof manner.

13. Device according to claim 1, in which at least one rolling element (6) can be rotationally driven and the electric machine is an electric motor, in particular a stepper motor.

14. Device according to claim 13, in which either the central rail (4) or the support element (2) is statically fixed to a support structure.

* * * * *